United States Patent

[11] 3,536,260

| [72] | Inventor | Robert A. Volz |
| | | West Chester, Pennsylvania |
| [21] | Appl. No. | 753,707 |
| [22] | Filed | Aug. 19, 1968 |
| [45] | Patented | Oct. 27, 1970 |
| [73] | Assignee | Scott Paper Company |
| | | Delaware County, Pennsylvania |
| | | a corporation of Pennsylvania |

[54] ANTIFUNGAL POLYURETHANE FOAM EXPLOSION RETARDANT FUEL TANK FILLER MEDIA
20 Claims, No Drawings

[52] U.S. Cl. .................................................. 239/6,
239/55, 239/56; 424/15, 424/22, 424/27, 424/29,
424/78, 424/245, 424/263; 48/179; 62/45;
105/358; 114/74, 114/121, 114/142, 114/183;
137/268; 158/46; 169/4; 206/.7; 261/72, 261/94,
261/119; 280/5

[51] Int. Cl. ............................................. A61l 13/00
[50] Field of Search .......................................... 239/6,
55, 56; 424/15, 22, 27, 29, 78, 245, 263

[56] References Cited

UNITED STATES PATENTS

| 1,968,136 | 7/1934 | Gardner | 239/6 |
| 2,809,971 | 10/1957 | Bernstein et al. | 424/245X |
| 3,006,870 | 10/1961 | Steinfatt et al. | 424/78X |
| 3,085,984 | 4/1963 | Degener et al. | 424/78X |
| 3,127,312 | 3/1964 | Boyer | 424/78X |
| 3,134,544 | 5/1964 | Copley | 239/55 |
| 3,269,900 | 8/1966 | Rubin | 424/19 |

*Primary Examiner*—Shep K. Rose
*Attorney*—William J. Foley, Stanton T. Hadley and John W. Kane, Jr.

ABSTRACT: Product for inhibiting growth of fungi for a prolonged period of time in a growth-supporting liquid medium comprising a body of open-cell or reticulated polyurethane foam having substantially uniformly distributed within the polyurethane matrix a compound selected from the group consisting of soluble 1-hydroxy-2-pyridinethiones and soluble salts and derivatives thereof. The process for controlling fungus growth in a liquid, fungus-growth-supporting medium, comprising the steps of intimately contacting said liquid medium for a prolonged period of time with a permeable polyurethane foam as described above.

ANTIFUNGAL POLYURETHANE FOAM EXPLOSION RETARDANT FUEL TANK FILLER MEDIA

BRIEF DESCRIPTION OF THE INVENTION

The invention relates to permeable polyurethane foam bodies which may be used as microorganism-growth-inhibiting media. The polyurethane foam products, in accordance with this invention, have uniformly distributed within the polyurethane matrix certain microorganism-growth-inhibiting compounds, which compounds are gradually leached from the polyurethane foam into the surrounding liquid ambient, to provide a sustained release of the growth-inhibiting compound over a prolonged period of time, which may be up to several months and even years. The compounds which are distributed throughout the polyurethane foam material, pursuant to this invention, are soluble 1-hydroxy-2-pyridinethiones and soluble salts and derivatives thereof, particularly the zinc, sodium, calcium, and barium salts of 1-hydroxy-2-pyridinethione. The invention also relates to a process for inhibiting the growth of microorganisms in a liquid microorganism-growth-supporting medium, by contacting said liquid medium intimately, over a prolonged period of time, on the order of up to several months or longer, with a permeable polyurethane foam material containing a fungistat as set forth above.

BACKGROUND OF THE INVENTION

Permeable polyurethane foams, particularly reticulated polyurethane foams, are known to have an explosion retardant characteristic, when placed in intimate contact with an explosive liquid or gas. Therefore, because of the high amount of void volume of polyurethane foams, i.e., approximately 97 percent void volume, these foams have been used in fuel tanks, as fuel tank fillers, to prevent explosion of the fuel in the tanks. These foam-filled fuel tanks are particularly useful for racing cars, fuel-carrying vehicles, such as railroad tank cars and over-the-road gas trucks, and military vehicles where high-speed accidents would otherwise create a dangerous, destructive explosion. Also, with respect to military vehicles the foam-filled fuel tanks will not explode when pierced by an explosive projectile. The fuels which are commonly used for military vehicles are known to provide nutrition for the growth of various fungi, particularly when contaminated with even small amounts of moisture, especially those fungi which exist in the tropical climates. These fungi grow by using the hydrocarbons in the fuel as nutrients, and the mycelia which the fungi form serve to clog the foam and the fuel tank, ultimately preventing access of fuel from the fuel tank to the vehicle engine. Also, it is known that certain residues of killed fungi, in aqueous solution (which may occur if some slight amount of water is present in a fuel mixture) set up a galvanic action between the killed-fungus residue and the aluminum skin of an aircraft or other vehicle, which causes corrosion of the aluminum skin. Such clogging of gas tank and skin corrosion effects are obviously undesirable, and it has long been sought to find a way for producing an effective, inexpensive, antifungal medium for use in such fuel tanks.

Also, ship bilges, which contain great quantities of water, are often filled with fuel vapors which escape from the fuel storage tanks for the ship engines. These fuel vapors present a hazard, because of their explosive potential. It is desirable to be able to fill ship bilges with explosion-retardant polyurethane foam, for the purpose of preventing any explosion of the fuel gas which accumulates in the ship bilges. However, fungi grow profusely in ship bilges, and the use of foam to fill the bilges, if fungus growth was permitted to occur, would relatively quickly clog the foam, to prevent the convenient pumping of water into and out of the bilges, and would render the foams relatively nonfunctional, because the foams would become clogged and obstructed.

It has long been desired to provide a relatively convenient and inexpensive technique, for inhibiting fungus growth in liquid fungus-growth-supporting media. It has been suggested, as in U. S. Pat. No. 3,006,870, to incorporate certain fungus and bacteria growth restraining materials into polyurethane foams, for the purpose of preventing bacterial and fungal degradation of these foams per se. The foregoing patent relates to the incorporation into the polyurethane foam of 0.2 to 5.0 percent by weight, based on the weight of the foam, of a compound selected from the group consisting of tetra-lower alkyl-thiuramdisulfides and di-lower alkyl-dithiocarbamates, to prevent degradation of the foams.

Investigators have tried the use of reticulated polyurethane foam, both alone and containing 0.33 percent by weight and 0.66 percent by weight of tetraethylthiuram disulfide (consonant with the teachings of the foregoing patent) for the purpose of attempting to inhibit or prevent the growth of certain bacteria and fungi in military fuel systems. In the report, contained in the February, 1968 publication, APPLIED MICROBIOLOGY, at pages 426 and 427, the authors state at page 427, "The polymer with tetraethylthiuramdisulfide incorporated did not inhibit the growth of either fuel-utilizing microorganism (referring to the bacteria and the fungus). Both polymers (referring to the unimpregnated polyurethane foam and the tetraethylthiuram disulfide-impregnated polyurethane foam) enhanced growth of the fungus in the fuel-water system by functioning as a matrix for the attachment of mycelium." Consequently, it is surprising and unexpected to learn that, when a permeable polyurethane foam has incorporated and uniformly distributed therein, amounts of a compound selected from the group consisting of soluble 1-hydroxy-2-pyridinethiones and soluble salts and derivatives thereof, growth of fungus in a liquid fungus-growth-supporting medium is very extensively inhibited.

It is likewise surprising to note that the permeable polyurethane foam products of this invention, having incorporated throughout the polyurethane materials a substantial amount of the pyridinethione compounds noted, have a substantial antifungal effect over an extended period of time, providing a controlled and prolonged release of the antifungal material into the growth-supporting liquid medium.

The instant invention therefore presents an economical and convenient means for inhibiting the growth of fungi and other microorganisms in a fungus-growth-supporting liquid medium.

It is therefore an object of this invention to provide a permeable polyurethane foam product which is capable of dually functioning as an explosion-prevention medium for a liquid ambient, and preventing fungal growth for a prolonged period of time within such liquid ambient, by controlled release into the liquid, over an extended time period, of certain antifungal compounds contained within the matrix of polyurethane foam material.

A further object of this invention is to provide a process for the retardation, over a prolonged period of time, of growth of fungi in a liquid, fungus-growth-supporting medium, by intimately contacting such liquid medium with a permeable polyurethane foam body having uniformly distributed throughout the polyurethane foam matrix, a material selected from the group consisting of soluble 1-hydroxy-2-pyridinethiones and the soluble salts and derivatives thereof.

As is well known in the art, polyurethane foams, particularly those foams of the so-called semirigid and flexible types, are "open-cell" foams. That is to say, the polyurethane foams, which are composed of a multiplicity of dodecahedral cells having pentagonal cell walls formed by strands of polyurethane material connected at nexi, have less than about 83 percent of the cell membranes of the cell walls of the polyurethane foam material intact. In other words, in the "open-cell" foams there is intercommunication of the cells throughout the foam body. Open-cell foams may be converted into reticulated foams by the caustic reticulation or the explosion reticulation processes respectively disclosed in U. S. Pat. No. 3,171,820 and U. S. Pat. No. 3,175,025, among others. A reticulated polyurethane foam is a polyurethane foam having no more than about 25 percent, and preferably substantially less than 25 percent, of its cell wall membranes intact. For purposes of this patent application the term "permeable polyurethane foam" is used to designate both the so-called "open-cell" foams and the reticulated foams, as described above. The reticulated polyurethane foams, of course, are more permeable than the unreticulated, open-cell foams, because they have fewer obstructing cell walls, and are therefore preferred for the explosion-retarding fuel cell applications.

Polyurethane foams are produced by the reaction between a polyhydroxy-containing compound, usually a polyester polyol or a polyether polyol, with an organic polyisocyanate, in the presence of a blowing gas. The blowing gas is most usually carbon dioxide, which is formed by the incorporation of water in the reactant mix, and by the reaction between the water and an excess of the organic polyisocyanate. Polyurethane foams are categorized in three different categories as rigid, semirigid, and flexible, according to their resistance to deformation upon the application of compressive forces. The flexible and semirigid polyurethane foams are conventionally essentially open-cell in nature. The rigid polyurethane foams tend to be closed-cell in nature, although rigid foams may be open-cell, depending on the production technique and formulation being utilized. The instant invention is applicable to the permeable rigid, semirigid, and flexible polyurethane foams, although the preferred foams are the flexible polyurethane foams.

Pursuant to the instant invention the reactant mixture from which a permeable polyurethane foam is produced will include an amount in the range between 0.001 percent and 10.0 percent by weight, based upon the weight of the polyurethane foam, of a compound selected from the group consisting of soluble 1-hydroxy-2-pyridinethiones and the soluble salts and derivatives thereof. Such pyridinethione compounds are disclosed and their manufacture described in U. S. Pat. Nos. 2,686,786, 2,809,971 and 2,909,459. The pyridinethiones are known per se to have antifungal and antimicroorganism properties, and the instant invention requires the use of one of these compounds. An essential characteristic of each pyridinethione compound utilized pursuant to this invention is that it be soluble in the liquid medium with which the permeable polyurethane foam is to be contacted for the purpose of retarding fungus growth in such liquid medium. The degree of solubility required with respect to the pyridinethione compounds used pursuant hereto is not great, and a solubility of any such compound (in the liquid medium in question) on the order of 3 parts or more per million parts of liquid, fungus-growth-supporting medium is adequate for the purposes of this invention; any pyridinethione compound exhibiting such a degree of solubility is considered to be "soluble" for the purposes of this invention. In fact, the highly soluble pyridinethione compounds are less preferable than those of moderate solubility, because the former are more rapidly leached (considering equal amounts thereof) into the liquid ambient when the foams of this invention are placed in prolonged contact with a liquid, growth-supporting medium. It will be appreciated that a particular pyridinethione may be "soluble" in one or more growth-supporting liquids, and may not be "soluble" in others. Such a compound is within the purview of this invention, but it will only be used with respect to those liquids in which it is "soluble".

As has been noted, the amount of a soluble pyridinethione which can be incorporated into the polyurethane foam is in the range from about 0.001 percent to about 10.0 percent by weight, based on the weight of the polyurethane foam. Preferably, however, the pyridinethione compounds in question will be present in an amount in the range from about 0.001 percent to about 0.2 percent by weight, based on the weight of the polyurethane foam. It will be understood that two or more soluble pyridinethiones may be incorporated into a particular foam formulation, so long as their total weight does not fall outside the specified limits. This combination of two or more pyridinethiones may be utilized to obtain an optimization of solubility, range and/or magnitude of activity, and minimum cost.

The pyridinethione compounds utilized may be particulate or liquid, and this aspect of the compounds in question is not essential. For example, the zinc salt of 1-hydroxy-2-pyridinethione is particulate in nature, whereas the sodium salt of 1-hydroxy-2-pyridinethione is liquid in nature, and both may be effectively used in this invention. The antifungal compounds of this invention are incorporated into the polyurethane foams by being uniformly mixed with the other reactants for the production of the polyurethane foam. The reaction mixture will conventionally include a polyisocyanate, the polyhydroxy-containing compound, water, the antifungal compound or compounds of this invention, and catalysts, stabilizers, dyes and the like, the details of which are well known in the art. The polyurethane foams of this invention may be produced on conventional, commercial bun-forming polyurethane foam machines or on the cylindrical foam-forming machine of U. S. Pat. No. 3,297,802. If it is desired to reticulate the open-cell polyurethane foam produced on either the bun machine, or the cylindrical casting machine, such a foam may be reticulated in accordance with the procedures set forth in the aforementioned U. S. Pat. Nos. 3,171,820 and 3,175,025.

In the conventional use of these polyurethane foam products as fuel tank filler media, the polyurethane foam products will be formed from a rectangular bun, and the buns will be cut to shape, to fit into the particular tank in question. It is noteworthy that, although the primary uses of the particulated foams of this invention are with respect to aircraft fuel tanks, they may also be used in oil storage tanks, tank trucks, railroad tank cars, truck gasoline tanks, automobile gas tanks, and with respect to any other receptacles containing a fungus-growth-supporting liquid.

It is to be noted that the polyurethane foams may be produced in pore densities in the range from about 10 to about 150 pores per linear inch, by techniques which are well known in the art. The instant invention is applicable to polyurethane foam having any such pore density, but it is preferable that the foams of the invention have a pore density in the range from about 10 pores per linear inch to about 20 pores per linear inch, with approximately 10 pores per linear inch being the most desired pore density.

The most preferred embodiment of the invention comprises a reticulated, flexible polyurethane foam produced by the reaction of a polyester-type polyol, with toluene diisocyanate, and incorporating approximately 0.001 percent to about 0.2 percent (of the total foam weight) of a pyridinethione from the group consisting of the sodium, zinc, barium, and calcium salts of 1-hydroxy-2-pyridinethione. The desired foam will have a pore density of about 10 pores per linear inch, and a weight density of about 2 pounds per cubic foot.

The amount and duration of the antifungal activity of the foam products of this invention may be regulated by varying the nature and amount of the antifungal compounds utilized pursuant hereto. Greater amounts of any particular antifungal compounds will generally increase the period of antifungal activity, and using antifungal compounds of moderate solubility in the liquid ambient contacting the foam will also increase the duration of the antifungal activity.

In the following examples, the polyester resin utilized is a diethylene glycol-adipic acid-type of polyester, having the following typical characteristics:
Hydroxyl Number —49—55
Maximum Acid Number —2.0
Maximum Water Content —0.1 percent
Maximum Color —3.0
Viscosity at 25°C. —17,000—22,000 centipoises
Specific Gravity at 25°C. —1.19

In the following examples, Fomrez 77—86 is a Witco polyoxyethylated fatty acid, which is used as a coupling agent, and Fomrez 10—58 is a Witco dialkyl ammonium oleate, which is also used as a coupling agent. Fomrez 77—86 has a pH (in 3 percent aqueous dispersion) of 3.0 to 4.0, an acid number of 12 to 16, specific gravity at 25°C. of 1.00 to 1.02, a weight of 8.3 to 8.45 pounds per gallon, and a maximum percent moisture of 0.3. Fomrez 10—58 has a pH (in 3 percent aqueous dispersion) of 8.5 to 9.0, and acid number of 170 to 180, specific gravity at 25°C. of 0.888, a weight of 7.4 pounds per gallon, a maximum percent moisture of 0.4 percent, and a Gardner color of 9 to 11.

EXAMPLE 1

A polyester-type polyurethane foam was produced on a conventional bun-type polyurethane foam machine, utilizing an adipic acid-diethylene glycol-type polyester. A first component of the formulation was the polyester resin. The second component of the formulation consisted of 46.8 parts per hundred parts (based on 100 parts of resin) of toluene diisocyanate, 3.6 p.p.h. of water, and 0.1 p.p.h. (0.07 percent of the weight of the final foam product) of the sodim salt of 1-hydroxy-2-pyridinethione. The third component consisted of 2.6 p.p.h. of n-ethylmorpholine, 1.0 p.p.h. of Fomrez 77—86, and 1.0 p.p.h. of Fomrez 10—58. The three components were well mixed in the mixing and foaming head of the foaming machine and deposited on a conventional bun-type polyurethane foam casting machine. The cured polyurethane foam was then reticulated by the caustic reticulation process disclosed in U.S. Pat. No. 3,171,820.

EXAMPLE 2

A formulation was produced, in accordance with the procedure set forth in example 1. The formulation consisted of a four-component system. One component was 100 parts of the polyester resin. The second component comprised 46.8 p.p.h. of toluene diisocyanate. The third component consisted of 2.6 p.p.h. of n-ethylmorpholine, 1.0 p.p.h. of Fomrez 77-—86, 1.0 p.p.h. of Fomrez 10—58, and 0.6 p.p.h. of water. The fourth component consisted of 3.0 p.p.h. of water and 0.1 p.p.h. (0.07 percent of the weight of the final foam product) of the zinc salt of 1-hydroxy-2-pyridinethione. The foam product was reticulated by the same process as set forth in example 1.

EXAMPLE 3

A polyurethane foam was produced in accordance with the procedure and formulation set forth in example 1 with the sole exceptions that the formulation contained 0.95 p.p.h. (0.64 percent of the weight of the foam product) of tetraethylthiuram disulfide, and 1.9 p.p.h. of methylene chloride (as a solvent for the tetraethylthiuram disulfide).

EXAMPLE 4

A sample was produced in accordance with the procedure set forth in example 1, with the sole exceptions that no antifungal compound was included in the formulation, and 2.5 p.p.h. of n-ethylmorpholine was used, rather than 2.6 p.p.h.

Certain experiments were run to determine the antifungal activity in jet fuel of the product of examples 1 to 4. The procedure used in these experiments was as follows. Each foam sample was cut to fit inside a half-pint glass milk bottle. Each sample was cleansed, and sterilized to ensure sterility thereof, and was then transferred to a milk bottle. The aqueous portion of the test system was composed of 40 ml. of a mineral salts solution. The mineral salts solution was also sterilized by autoclaving. Then 60 mls. of filter-sterilized JP-4 jet aircraft fuel was added to the bottle. In some instances, shown in table 2, the JP-4 fuel included 0.1 percent of an anti-icing additive, consisting of 99.6 percent methylcellulose and 0.4 percent glycerol. The fungal culture against which the samples were tested was Hormodendrum sp. The fungal cultures were incubated at 26°C. Fungal growth was estimated by visual observation for the development of a mycelial mat.

The result of the experiments with respect to the fungal growth in a mineral salts solution plus JP-4 fuel are shown in table 1. The results of the tests with respect to a mineral salts solution plus JP-4 fuel with 0.1 percent anti-icing additive with respect to the growth of the same fungus are shown in table 2. It will be seen that the foam product of the invention permitted virtually no visible mycelial growth in a three-week period, whereas the prior art foam and the untreated foam produced a marked mycelial growth.

TABLE 1

Effect of Foam and Additives on Growth of Hormodendrum sp. in a Mineral Salts Solution plus JP-4 Fuel

| Incubation Time (days) | No Foam | Control Foam, Example 4 | | Example 1 | | Example 3 | | Example 2 | |
|---|---|---|---|---|---|---|---|---|---|
| 0 | 0 | 0 | 0 | 0 | 0 | 0 | 0 | 0 | 0 |
| 1 | 0 | 0 | 0 | 0 | 0 | 0 | 0 | 0 | 0 |
| 2 | + | + | + | 0 | 0 | + | + | 0 | 0 |
| 3 | +++ | ++ | ++ | 0 | 0 | + | + | 0 | 0 |
| 5 | +++ | ++ | ++ | 0 | 0 | ++ | ++ | 0 | 0 |
| 7 | +++ | +++ | +++ | 0 | 0 | ++ | ++ | 0 | 0 |
| 9 | +++ | +++ | +++ | 0 | 0 | ++ | ++ | 0 | 0 |
| 11 | +++ | +++ | +++ | 0 | 0 | ++ | ++ | 0 | 0 |
| 13 | +++ | +++ | +++ | 0 | + | +++ | +++ | + | 0 |
| 18 | CF | CF | CF | 0 | + | +++ | +++ | + | 0 |
| 21 | CF | CF | CF | 0 | + | +++ | +++ | + | 0 |

NOTATIONS:
0=No visible mycelium.
+=Visible growth but very small fragments of mycelium.
++=Definite growth.
+++=Well developed mycelial mat.
CF=Confluent growth (solid mat).

TABLE 2
Effect of Foam and Additives on Growth of Hormodendrum sp. in a Mineral Salts Solution plus JP-4 Fuel with 0.1% AIA

| Incubation Time (days) | No Foam | Control Foam, Example 4 | | Example 1 | | Example 3 | | Example 2 | |
|---|---|---|---|---|---|---|---|---|---|
| 0 | 0 | 0 | 0 | 0 | 0 | 0 | 0 | 0 | 0 |
| 1 | 0 | 0 | 0 | 0 | 0 | 0 | 0 | 0 | 0 |
| 2 | 0 | 0 | 0 | 0 | 0 | 0 | 0 | 0 | 0 |
| 3 | + | 0 | 0 | 0 | 0 | 0 | 0 | 0 | 0 |
| 5 | + | 0 | + | 0 | 0 | 0 | 0 | 0 | 0 |
| 7 | ++ | 0 | + | 0 | 0 | 0 | 0 | 0 | 0 |
| 9 | ++ | 0 | + | 0 | 0 | 0 | 0 | 0 | 0 |
| 11 | ++ | + | + | 0 | 0 | 0 | 0 | 0 | 0 |
| 13 | ++ | + | + | 0 | 0 | + | + | 0 | 0 |
| 18 | +++ | +++ | +++ | 0 | 0 | + | + | 0 | 0 |
| 21 | CF | CF | CF | 0 | 0 | ++ | ++ | 0 | 0 |

NOTATIONS:
0 = No visible mycelium.
+ = Visible growth but very small fragments of mycelium.
++ = Definite growth.
+++ = Well developed mycelial mat.
CF = Confluent growth (solid mat).

EXAMPLE 5

A polyurethane foam was produced in accordance with the formulation and procedures set forth in example 1, with the following exceptions. 46.3 p.p.h. of TDI, 2.5 p.p.h. of n-ethylmorpholine and 0.1 p.p.h. of the calcium salt of 1-hydroxy-2-pyridinethione (0.07 percent of the weight of the final foam product) were used, the calcium salt being substituted for the sodium salt of example 1. This product has a marked antifungal effect, when placed in a liquid medium, over a prolonged period of time.

EXAMPLE 6

A polyurethane foam was made which was identical to the formulation of example 5, using the procedure of example 1, except that 0.1 p.p.h. of the barium salt of 1-hydroxy-2-pyridinethione was substituted for the calcium salt. This product has a marked antifungal effect, when placed in a liquid medium, over a prolonged period of time.

It is noteworthy that, in none of the foregoing examples utilizing the salts of 1-hydroxy-2-pyridinethione, was the structure of the polyurethane form, or its cellular character, deleteriously affected thereby.

I claim:

1. An article for inhibiting growth of fungal microorganisms for a prolonged period of time in a growth-supporting liquid fuel ambient comprising: a body of permeable polyurethane foam having an explosion retardant characteristic formed to fit a fuel tank of a multiplicity of intercommunicating dodecahedral cells having pentagonal cell walls comprising strands of polyurethane material joined at nexi, and an effective amount of at least one antifungal compound selected from the group consisting of soluble 1-hydroxy-2-pyridinethiones and soluble salts and derivatives thereof uniformly dispersed within said strands and nexi, whereby said compound is gradually leached into said liquid fuel over a prolonged period of time when contacted therewith.

2. An article as set forth in claim 1, wherein said polyurethane foam is the reaction product of a polyhydroxy-containing compound and a polyisocyanate, and said antifungal compound is present in an amount in the range from about 0.001 percent to about 10.0 percent by weight, based on the weight of the foam.

3. An article as set forth in claim 2, wherein said plyhydoxy-containing compound is a polyester polyol.

4. An article as set forth in claim 2, wherein said polyhydroxy-containing compound is a polyether polyol.

5. An article as set forth in claim 2, wherein said antifungal compound is present in an amount of about 0.07 percent by weight, based on the weight of the foam.

6. An article as set forth in claim 2, wherein said antifungal compound is present in an amount in the range from about 0.001 percent to about 0.2 percent by weight, based on the weight of the foam.

7. An article as set forth in claim 1, wherein said foam is a reticulated foam having a pore density in the range from about 10 to about 20 pores per linear inch.

8. An article as set forth in claim 2, wherein said antifungal compound is selected from the group consisting of 1-hydroxy-2-pyridinethione and the sodium, calcium, barium and zinc salts thereof.

9. An article as set forth in claim 8, wherein said polyurethane is a reticulated polyester-type polyurethane having a pore density in the range from about 10 to about 20 pores per linear inch and is produced from an adipic acid-diethylene glycol polyester, said antifungal compound being present in an amount in the range from about 0.001 percent to about 0.2 percent by weight, based on the weight of the foam.

10. A process as set forth in claim 13, wherein said antifungal compound is selected from the group consisting of 1-hydroxy-2-pyridinethione and the calcium, sodium, zinc and barium salts thereof.

11. A process as set forth in claim 13, wherein said foam is a polyester-type polyurethane having a pore density in the range from about 10 to about 20 pores per linear inch and said antifungal compound is present in an amount in the range from about 0.001 percent to about 0.2 percent by weight, based on the weight of said foam.

12. A process as set forth in claim 10, wherein said foam is a flexible, reticulated foam made from an adipic acid-diethylene glycol ester, said foam having a pore density of about 10 pores per linear inch, and said antifungal compound is present in an amount in the range from about 0.001 to about 0.2 percent by weight, based on the weight of the foam.

13. A process for providing controlled release of a fungal microorganism-growth-retarding material in a liquid fuel growth-supporting medium, comprising fitting in a fuel tank in order to thereby attain intimate contact with said liquid fuel, for a prolonged period of time, a permeable polyurethane foam having an explosion retardant characteristic, shaped and fitted as fuel tank filler media, comprising cells of a polyurethane material, having effective amounts of at least one antifungal compound selected from the group consisting of soluble 1-hydroxy-2-pyridinethiones and soluble salts and derivatives thereof, uniformly distributed within the matrix of said polyurethane material.

14. An article for inhibiting growth of fungal microorganisms for a prolonged period of time in a growth-supporting liquid fuel ambient comprising (a) a body of permeable polyurethane foam formed to fit as fuel tank filler media consisting of a multiplicity of intercommunicating dodecahedral cells having pentagonal cell walls comprising strands of polyurethane material joined at nexi, and (b) an effective amount of at least one antifungal compound selected from the group consisting of soluble 1-hydroxy-2-pyridinethiones and soluble salts and derivatives thereof uniformly dispersed within said strands and nexi, whereby said compound is gradually leached into said liquid fuel over a prolonged period of time when contacted therewith.

15. In combination means defining a chamber for containing a liquid fuel supporting the growth of fungal microorganisms, and permeable polyurethane foam having an explosion retardant characteristic formed, shaped and fitted as fuel tank filler media in said fuel chamber, said foam formed of a multiplicity of intercommunicating dodecahedral cells having pentagonal cell walls comprising strands of polyurethane material joined at nexi, said foam containing an effective amount of at least one antifungal compound selected from the group consisting of soluble 1-hydroxy-2-pyridinethiones and soluble salts and derivatives thereof uniformly dispersed within said strands and nexi, whereby said compound is gradually leached into said liquid fuel over a prolonged period of time when contacted therewith.

16. A method for controlling living 1-hydroxy-2-pyridinethione susceptible microorganisms in a fuel tank for liquid fuel which comprises fitting therein a permeable polyurethane foam having an explosion retardant characteristic formed and shaped as fuel tank filler media for said fuel tank containing a microbiocidally effective amount of a compound selected from the group consisting of 1-hydroxy-2-pyridinethiones and soluble salts and derivatives thereof directly in contact with said organism.

17. A method as defined in claim 16 wherein said living microorganisms are fungi.

18. In combination means defining a chamber in a land vehicle for containing a liquid fuel supporting the growth of fungal microorganisms, and permeable polyurethane foam having an explosion retardant characteristic formed, shaped and fitted as fuel tank filler media in said fuel chamber, said foam formed of a multiplicity of intercommunicating dodecahedral cells having pentagonal cell walls comprising strands of polyurethane material joined at nexi, said foam containing an effective amount of at least one antifungal compound selected from the group consisting of soluble 1-hydroxy-2-pyridinethiones and soluble salts and derivatives thereof uniformly dispersed within said strands and nexi, whereby said compound is gradually leached into said liquid fuel over a prolonged period of time when contacted therewith.

19. In combination means defining a chamber in an air vehicle for containing a liquid fuel supporting the growth of fungal microorganisms, and permeable polyurethane foam having an explosion retardant characteristic formed, shaped and fitted as fuel tank filler media in said fuel chamber, said foam formed of a multiplicity of intercommunicating dodecahedral cells having pentagonal cell walls comprising strands of polyurethane material joined at nexi, said foam containing an effective amount of at least one antifungal compound selected from the group consisting of soluble 1-hydroxy-2-pyridinethiones and soluble salts and derivatives thereof uniformly dispersed within said strands and nexi, whereby said compound is gradually leached into said liquid fuel over a prolonged period of time when contacted therewith.

20. In combination means defining a chamber in a water vehicle for containing a liquid fuel supporting the growth of fungal microorganisms, and permeable polyurethane foam having an explosion retardant characteristic formed, shaped and fitted as fuel tank filler media in said fuel chamber, said foam formed of a multiplicity of intercommunicating dodecahedral cells having pentagonal cell walls comprising strands of polyurethane material joined at nexi, said foam containing an effective amount of at least one antifungal compound selected from the group consisting of soluble 1-hydroxy-2-pyridinethiones and soluble salts and derivatives thereof uniformly dispersed within said strands and nexi, whereby said compound is gradually leached into said liquid fuel over a prolonged period of time when contacted therewith.